(12) United States Patent
Sawamura et al.

(10) Patent No.: US 10,050,578 B2
(45) Date of Patent: Aug. 14, 2018

(54) MOTOR CONTROL SYSTEM, INITIAL CHARGER, AND METHOD FOR DETECTING FAILURE

(71) Applicant: Kabushiki Kaisha Yaskawa Denki, Kitakyushu-shi (JP)

(72) Inventors: Mitsujiro Sawamura, Kitakyushu (JP); Kunimasa Ando, Kitakyushu (JP); Tatsuaki Wada, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 0 days.

(21) Appl. No.: 15/622,797

(22) Filed: Jun. 14, 2017

(65) Prior Publication Data

US 2018/0013373 A1 Jan. 11, 2018

(30) Foreign Application Priority Data

Jul. 7, 2016 (JP) .................................. 2016-134987

(51) Int. Cl.
*H02P 27/04* (2016.01)
*H02P 29/024* (2016.01)
(Continued)

(52) U.S. Cl.
CPC ............ *H02P 29/024* (2013.01); *H02M 1/08* (2013.01); *H02M 3/158* (2013.01); *H02M 7/06* (2013.01);
(Continued)

(58) Field of Classification Search
CPC ...... H02P 1/00; H02P 3/00; H02P 6/00; H02P 23/00; H02P 27/00; H02P 27/04;
(Continued)

(56) References Cited

U.S. PATENT DOCUMENTS 8,143,835 B2 * 3/2012 Taguchi ................ H02M 3/156
318/254.1
2016/0072379 A1 3/2016 Hirano et al.

FOREIGN PATENT DOCUMENTS

JP       10-164709 A    6/1998
JP    2013-027095 A    2/2013
(Continued)

OTHER PUBLICATIONS

Office Action dated Jul. 24, 2017 in Japanese Patent Application No. 2016-134987 (with English language translation).

*Primary Examiner* — Antony M Paul
(74) *Attorney, Agent, or Firm* — Oblon, McClelland, Maier & Neustadt, L.L.P.

(57) ABSTRACT

A motor control system includes a DC-to-DC converter including a semiconductor switch and a reactor that cooperates with the switch to convert input-side DC bus voltage across first and second input-side DC buses into predetermined output-side DC bus voltage across first and second output-side DC buses and to output the output-side voltage, control circuitry that controls duty factor of the switch and determine, based on input-side detection value of the input-side voltage and output-side detection value of the output-side voltage, whether there is failure in the system when the factor is 100 percent and reactor-current detection value of reactor current through the reactor is approximately zero, a smoothing capacitor connected to the output-side buses and disposed between the output-side buses, and an inverter that is connected to the capacitor through the output-side buses, converts DC power from the output-side buses into AC power and supplies the power to a motor.

20 Claims, 9 Drawing Sheets

(51) Int. Cl.
  *H02M 7/06* (2006.01)
  *H02M 3/158* (2006.01)
  *H02M 7/5395* (2006.01)
  *H02P 27/08* (2006.01)
  *H02M 1/08* (2006.01)
  *H02M 1/00* (2006.01)

(52) U.S. Cl.
  CPC .......... *H02M 7/5395* (2013.01); *H02P 27/08* (2013.01); *H02M 2001/0009* (2013.01)

(58) Field of Classification Search
  CPC .. H02P 27/06; H02P 41/00; H02P 1/24; H02P 1/42; G05B 11/28
  USPC ......... 318/400.01, 400.02, 400.14, 700, 701, 318/727, 799, 800, 801, 795, 805, 807; 388/804, 811, 819, 829, 831; 363/21.1, 363/40, 44, 95, 120, 175; 361/18, 19, 23; 327/175
  See application file for complete search history.

(56) References Cited

FOREIGN PATENT DOCUMENTS

| | | |
|---|---|---|
| JP | 2015-142485 A | 8/2015 |
| JP | 2016-59177 A | 4/2016 |

\* cited by examiner

Comparative example (where failure exists)

Comparative example (where no failure exists)

MOTOR CONTROL SYSTEM, INITIAL CHARGER, AND METHOD FOR DETECTING FAILURE

CROSS-REFERENCE TO RELATED APPLICATIONS

The present application claims priority under 35 U.S.C. § 119 to Japanese Patent Application No. 2016-134987, filed Jul. 7, 2016. The contents of this application are incorporated herein by reference in their entirety.

BACKGROUND OF THE INVENTION

Field of the Invention

The embodiments disclosed herein relate to a motor control system, an initial charger, and a method for detecting a failure.

Description of the Background

Japanese Unexamined Patent Application Publication No. 2013-27095 discloses a power converter that causes a smoothing capacitor to undergo initial charging by gradually increasing with time the duty factor of a chopper disposed between the smoothing capacitor and direct-current (DC) power source, and that at a duty factor of 100% (percent), separates the chopper from DC bus to directly connect the DC power source and the smoothing capacitor to each other.

SUMMARY OF THE INVENTION

According to one aspect of the present disclosure, a motor control system includes a DC-to-DC converter including a semiconductor switch and a reactor that cooperates with the semiconductor switch to convert an input-side DC bus voltage across first and second input-side DC buses into a predetermined output-side DC bus voltage across first and second output-side DC buses and to output the output-side DC bus voltage, control circuitry that controls a duty factor of the semiconductor switch and determine, based on an input-side detection value of the input-side DC bus voltage and an output-side detection value of the output-side DC bus voltage, whether there is a failure in the motor control system when the duty factor is 100 percent and a reactor-current detection value of a reactor current flowing through the reactor is approximately zero, a smoothing capacitor connected to the first and second output-side DC buses and disposed between the first and second output-side DC buses, and an inverter that is connected to the smoothing capacitor through the first and second output-side DC buses, converts DC power from the first and second output-side DC buses into AC power and supplies the AC power to a motor.

According to another aspect of the present disclosure, an initial charger includes a DC-to-DC converter including a semiconductor switch and a reactor that cooperates with the semiconductor switch to convert an input-side DC bus voltage across first and second input-side DC buses into a predetermined output-side DC bus voltage across first and second output-side DC buses and to output the output-side DC bus voltage, control circuitry that controls a duty factor of the semiconductor switch, and a smoothing capacitor connected to the first and second output-side DC buses and disposed between the first and second output-side DC buses. The control circuitry is configured to determine, based on an input-side detection value of the input-side DC bus voltage and an output-side detection value of the output-side DC bus voltage, whether initial charging of the smoothing capacitor is completed when the duty factor is 100 percent and when a reactor-current detection value of a reactor current flowing through the reactor, is approximately zero.

According to yet another aspect of the present disclosure, a method for detecting a failure in a motor control system includes determining whether a duty factor of a semiconductor switch in a DC-to-DC converter is 100 percent, determining whether a reactor-current detection value of a reactor current flowing through a reactor in the DC-to-DC converter is approximately zero, and determining, based on an input-side detection value of an input-side DC bus voltage and an output-side detection value of an output-side DC bus voltage, whether a failure has occurred in a motor control system when the duty factor has been determined to be 100 percent and the reactor-current detection value of the reactor current flowing through the reactor has been determined to be approximately zero. The motor control system includes the DC-to-DC converter including the semiconductor switch and the reactor that cooperates with the semiconductor switch to convert the input-side DC bus voltage across first and second input-side DC buses into a predetermined output-side DC bus voltage across first and second output-side DC buses and to output the output-side DC bus voltage, control circuitry that controls the duty factor of the semiconductor switch, a smoothing capacitor connected to the first and second output-side DC buses and disposed between the first and second output-side DC buses, and an inverter that is connected to the smoothing capacitor through the first and second output-side DC buses, converts DC power from the first and second output-side DC buses into AC power and supplies the AC power to a motor.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
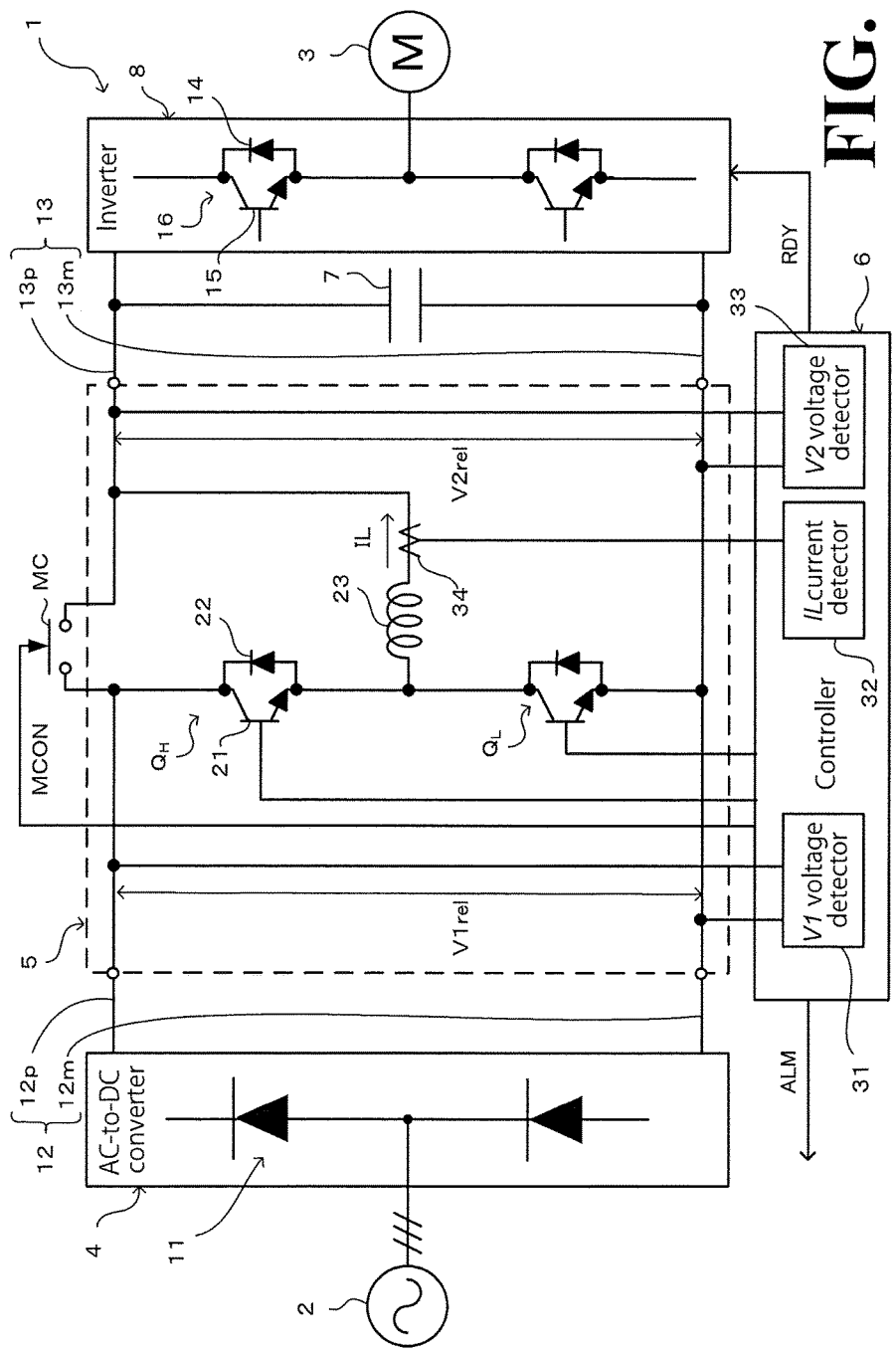
FIG. 1 is a schematic illustrating an exemplary circuit configuration and an exemplary system configuration of a motor control system according to an embodiment.

The embodiments will now be described with reference to the accompanying drawings, wherein like reference numerals designate corresponding or identical elements throughout the various drawings.

Configuration of Motor Control System

FIG. 1 is a schematic illustrating an exemplary circuit configuration and an exemplary system configuration of a motor control system 1 according to this embodiment. The motor control system 1 functions as a power conversion circuit that converts alternating-current (AC) power supplied from an external AC power source 2 into DC power, converts the DC power into a predetermined level of AC drive power through pulse width modulation (PWM) control, and supplies the AC drive power to a motor 3 so as to drivingly control the motor 3. As illustrated in FIG. 1, the motor control system 1 includes an AC-to-DC converter 4, a DC-to-DC converter 5, a contactor MC, a controller 6, a smoothing capacitor 7, an inverter 8, and the motor 3.

The AC-to-DC converter 4 according to this embodiment includes a diode bridge 11. The diode bridge 11 rectifies AC power supplied from the external AC power source 2 and supplies the resulting DC power to input-side DC buses 12.

The DC-to-DC converter 5 is a bidirectional chopper circuit (switching regulator) that includes semiconductor switching elements 21, diodes 22, and a reactor 23. Examples of each semiconductor switching element 21 include, but are not limited to, an insulated gate bipolar transistor (IGBT) and a metal-oxide-semiconductor field-effect transistor (MOSFET). Between the collector and emitter (between the drain and source) of the semiconductor switching element 21, one diode 22 (which is a parasitic diode in the case of MOSFET) is connected in parallel to the semiconductor switching element 21, whereby an arm switching element is implemented. Two such arm switching elements are connected in series to each other between a positive-side wire 13$p$ and a negative-side wire 13$m$, which constitute input-side DC buses 13. The forward direction of the diode 22 of each arm switching element is oriented from the negative-side wire 13$m$ toward the positive-side wire 13$p$, similarly to what is called a flywheel diode.

Among the arm switching elements, the arm switching element connected to the positive-side wire 13$p$ will be referred to as upper arm switching element $Q_H$, and the arm switching element connected to the negative-side wire 13$m$ will be referred to as lower arm switching element $Q_L$. The reactor 23 has one end (left-side end in FIG. 1) connected to an intermediate point between the two arm switching elements $Q_H$ and $Q_L$. A non-limiting example of the reactor 23 is a coil (inductance element) that accumulates and releases electromagnetic energy upon switching of the arm switching elements $Q_H$ and $Q_L$. An extension of the other end (right-side end in FIG. 1) of the reactor 23 and an extension of a negative-side wire 12$m$, which is one of the input-side DC buses 12, serve as the outputs of the DC-to-DC converter 5 that are connected to the output-side DC buses 13.

The contactor MC is a switch that makes and breaks the connection between a positive-side wire 12$p$, which is one of the input-side DC buses 12, and the positive-side wire 13$p$, which is one of the output-side DC buses 13. When the contactor MC is in connection-broken state, the input-side DC buses 12 are indirectly connected to the output-side DC buses 13 through the DC-to-DC converter 5. When the contactor MC is in connection state, the input-side DC buses 12 are directly connected to the output-side DC buses 13.

The controller 6 includes an input-side DC bus voltage detector 31 (simply indicated "V1 voltage detector" in FIG. 1), a reactor current detector 32 (simply indicated "IL current detector" in FIG. 1), and an output-side DC bus voltage detector 33 (simply indicated "V2 voltage detector" in FIG. 1). The input-side DC bus voltage detector 31 detects input-side DC bus voltage V1rel, which is actually applied between the positive-side wire 12$p$ and the negative-side wire 12$m$. The detection value of the input-side DC bus voltage V1rel will be referred to as input-side voltage detection value V1. Then, the input-side DC bus voltage detector 31 outputs the input-side voltage detection value V1. The reactor current detector 32 uses a current sensor 34 (a non-limiting example of which is a Hall effect device) to detect a reactor-current detection value, IL, of the reactor current flowing through the reactor 23. The output-side DC bus voltage detector 33 detects output-side DC bus voltage V2rel, which is actually applied between the positive-side wire 13$p$ and the negative-side wire 13$m$. The detection value of the output-side DC bus voltage V2rel will be referred to as output-side voltage detection value V2. Then, the output-side DC bus voltage detector 33 outputs the output-side voltage detection value V2. The controller 6 performs PWM control based on the detection values obtained by the detectors 31, 32, and 33 so as to control the switching of the arm switching elements $Q_H$ and $Q_L$. By controlling the switching of the arm switching elements $Q_H$ and $Q_L$, the controller 6 causes the DC-to-DC converter 5 to perform DC voltage conversion between the input-side DC bus voltage V1rel and the output-side DC bus voltage V2rel.

The smoothing capacitor 7 is connected to and disposed between the positive-side wire 13$p$ and the negative-side wire 13$m$. The smoothing capacitor 7 smoothens the DC power through the output-side DC buses 13 and is capable of being charged with a large amount of the DC power (that is, capable of storing a large capacity of electric charge). By storing a large capacity of electric charge, the smoothing capacitor 7 helps to deal with a temporary excess and/or shortage of DC power in the output-side DC buses 13 caused by rapid acceleration and/or rapid deceleration of the motor 3.

The inverter 8 (which is a non-limiting example of the inverter recited in the appended claims) includes switching circuits 16. Each switching circuit 16 includes a flywheel diode 14 and a bridge-connected semiconductor switching element 15. The flywheel diode 14 is connected in parallel to the semiconductor switching element 15. The inverter 8 undergoes PWM control performed by a drive controller (which is a non-limiting example of the upper-level device recited in the appended claims), not illustrated. Specifically, the semiconductor switching elements 15 are switched on and off to convert the DC power through the output-side DC buses 13 into an AC voltage that has a desired frequency and a desired waveform, and the AC voltage is supplied to the motor 3.

The controller 6 also controls signals to be output. The signals include a contactor control signal MCON, a ready signal RDY, and an emergency signal ALM. The contactor control signal MCON is used to make and break the connection of the contactor MC. The ready signal RDY is used to notify the drive controller (not illustrated) for the inverter 8 that preparation of DC power supply is completed. The emergency signal ALM is used to notify an upper-level controller, not illustrated, that there is a failure in the DC-to-DC converter 5.

The above-described processings performed at the above-described elements such as the input-side DC bus voltage detector 31, the reactor current detector 32, and the output-side DC bus voltage detector 33 may not necessarily be assigned to all of these elements. In another possible embodiment, the processings may be assigned to a smaller number of processing sections (a single processing section included). In still another possible embodiment, the processings may be assigned to a larger number of more meticulously segmented processing sections. The controller 6 may be implemented by a program executed by a CPU 901 (see FIG. 9, described later), or may be partially or entirely implemented by a tangible device or devices such as an application specific integrated circuit (ASIC), a field-programmable gate array (FPGA), and other electric circuit.

Basic Charging Operation of Motor Control System

In the motor control system 1 with the above-described configuration, external AC power is rectified and converted into DC power. Then, the DC power is supplied to the DC buses and smoothened by the smoothing capacitor 7, which is connected to and disposed between the DC buses. The DC power through the DC buses is used by the inverter 8 to control the AC drive power supplied to the motor 3. As the output of motors has been increasing, the amount of DC power supplied to the DC buses has been increasing accordingly. This may cause the initial charging of the smoothing capacitor 7 at the time of activation to result in a rush current (which is excessive in amount) to flow through the circuit. As a result, the various wires and parts of the circuit may become more prone to malfunctioning.

In view of this situation, this embodiment divides the DC buses into the input-side DC buses 12, which are on the side of DC power input, and the output-side DC buses 13, which are connected to the smoothing capacitor 7 to supply DC power to the inverter 8, with the DC-to-DC converter 5 disposed between the input-side DC buses 12 and the output-side DC buses 13. At the time of the initial charging of the smoothing capacitor 7, the controller 6 causes the DC-to-DC converter 5 to serve as what is called a step-down converter. Specifically, with the contactor MC in connection-broken state, the controller 6 keeps the lower arm switching element $Q_L$ in connection-broken state and switches the upper arm switching element $Q_H$ alone.

In the switching of the upper arm switching element $Q_H$, the controller 6 increases with time the duty factor (duty ratio) of the PWM control from 0% to perform constant current charging control that increases with time the charging power (charging voltage) for the smoothing capacitor 7 while making the charging current constant. At a duty factor of 100%, the controller 6 brings the contactor MC into connection state to directly connect the input-side DC buses 12 to the output-side DC buses 13. Thus, the charging operation of the smoothing capacitor 7 is completed. This charging operation prevents the charging current for the smoothing capacitor 7 from becoming a rush current (which is excessive in amount), enabling direct supply of DC power from the input-side DC buses 12 to the output-side DC buses 13.

Considerations on the Basic Charging Operation

In the above-described basic charging operation to implement the charging control, a switching operation involving a large amount of current is repeated. This may cause a failure such as wiring disconnection and short-circuiting to occur in the elements of the DC-to-DC converter 5 (such as the semiconductor switching elements 21, and the diodes 22, the reactor 23) and in various circuit elements.

Figure 2:
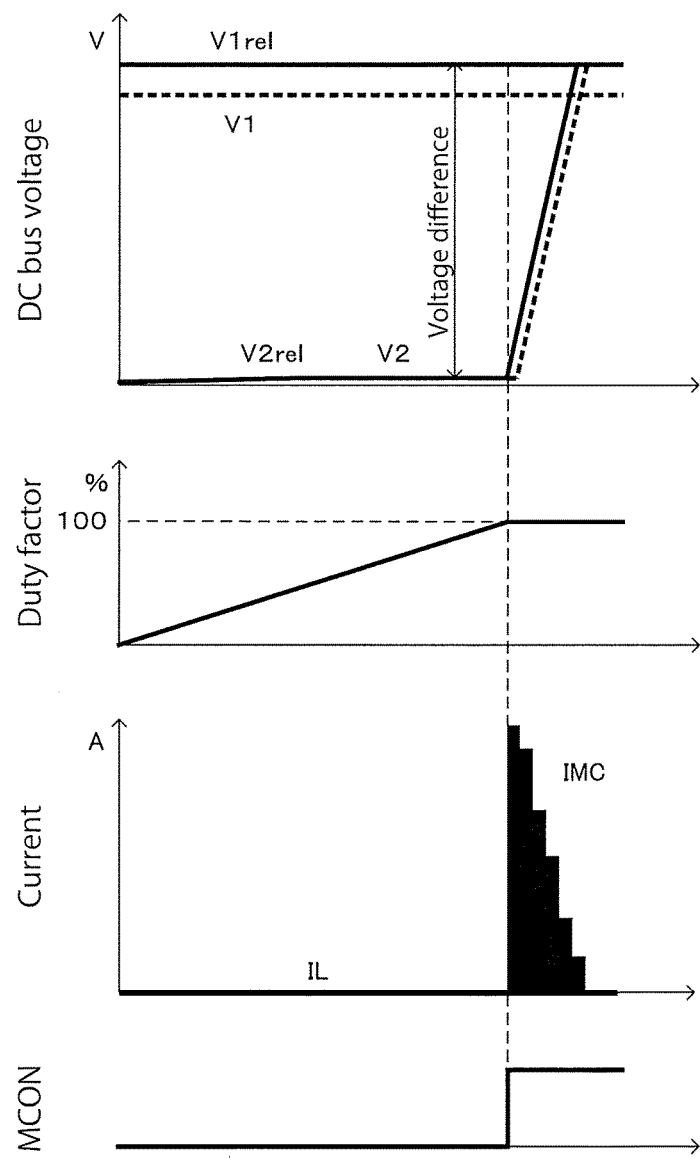
FIG. 2 illustrates how parameters change with time in a basic charging operation in a comparative example where there is a failure in a DC-to-DC converter.

FIG. 2 illustrates how parameters change with time in the above-described basic charging operation, which will be regarded as comparative example, where there is a failure in the DC-to-DC converter 5. The parameters are, from top downward in FIG. 2, DC bus voltage, duty factor, current, and contactor control signal MCON. In the comparative example illustrated in FIG. 2, there is a failure in the DC-to-DC converter 5. In this situation, even though the controller 6 increases the duty factor in an attempt to allow a reactor-current detection value, IL, to flow, substantially no reactor-current detection value IL flows, allowing the duty factor alone to increase.

This makes the charging of the smoothing capacitor 7 insufficient even at a duty factor of 100%, leaving a great voltage difference between the input-side DC bus voltage V1rel between the input-side DC buses 12 and the output-side DC bus voltage V2rel of the output-side DC buses 13. As in the above-described basic charging operation, if the contactor control signal MCON is ON-output only under the condition of 100% duty factor and the input-side DC buses 12 are directly connected to the output-side DC buses 13, a rush current IMC (which is excessive in amount) flows to the smoothing capacitor 7.

Figure 3:
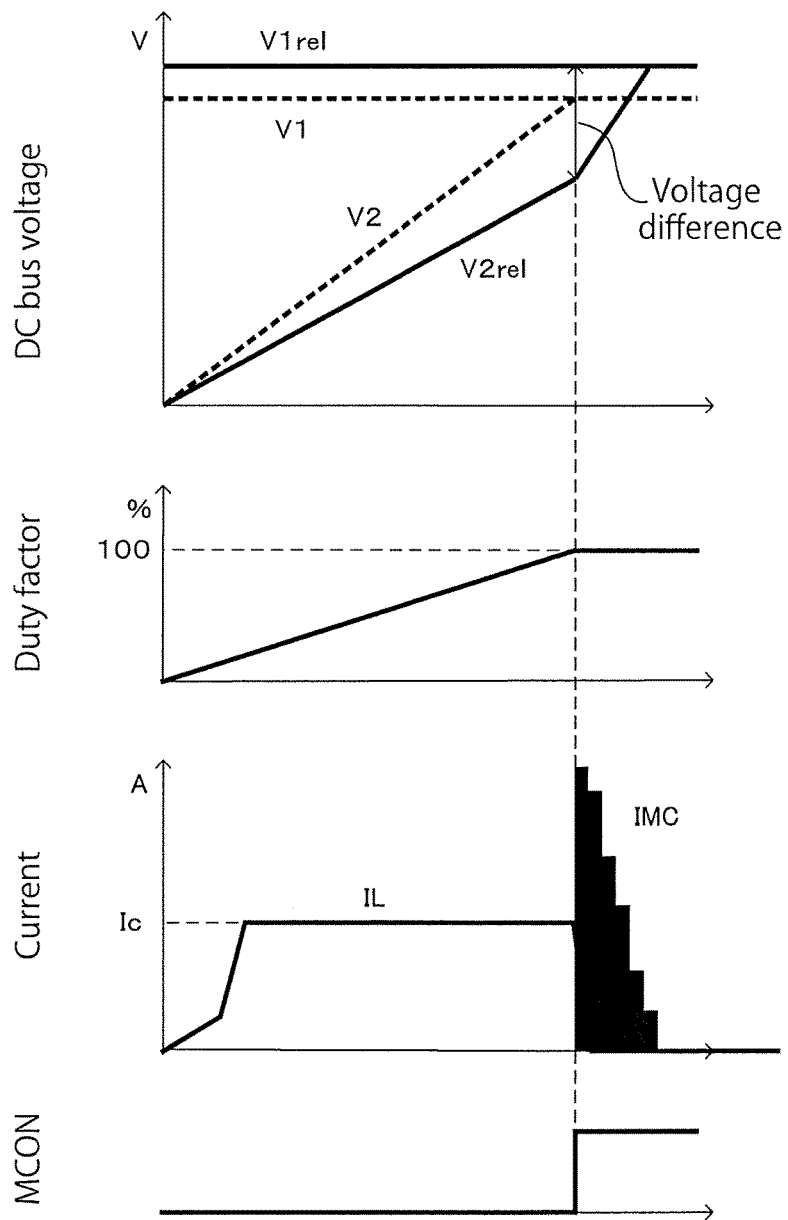
FIG. 3 illustrates how parameters change with time in the basic charging operation in the comparative example where there is no failure in the DC-to-DC converter.

With the above-described possible failure taken into consideration, a possible solution to prevent the rush current IMC from flowing into the smoothing capacitor 7 is to directly connect the input-side DC buses 12 to the output-side DC buses 13 when, as well as at a duty factor of 100%, the input-side DC bus voltage V1rel and the output-side DC bus voltage V2rel approximately coincide. However, even when there is no failure in the DC-to-DC converter 5, an equally great rush current IMC may occur as illustrated in FIG. 3, which is to be compared with FIG. 2. This rush current IMC is caused by a detection error of the input-side voltage detection value V1 and a detection error of the output-side voltage detection value V2.

In the comparative example illustrated in FIG. 3, the input-side voltage detection value V1 and the output-side voltage detection value V2 coincide when the duty factor reaches 100% after the duty factor has been increased to make the reactor-current detection value IL constant at constant value k. However, the detection errors of the voltage detection values V1 and V2 are too large to enable detection of the voltage difference between the input-side DC bus voltage V1rel and the output-side DC bus voltage V2rel, even though the voltage difference actually exists. In this situation, if the contactor control signal MCON is ON-output to directly connect the input-side DC buses 12 to the output-side DC buses 13, the rush current IMC flows to the smoothing capacitor 7.

Charging Operation According to the Embodiment

Figure 4:
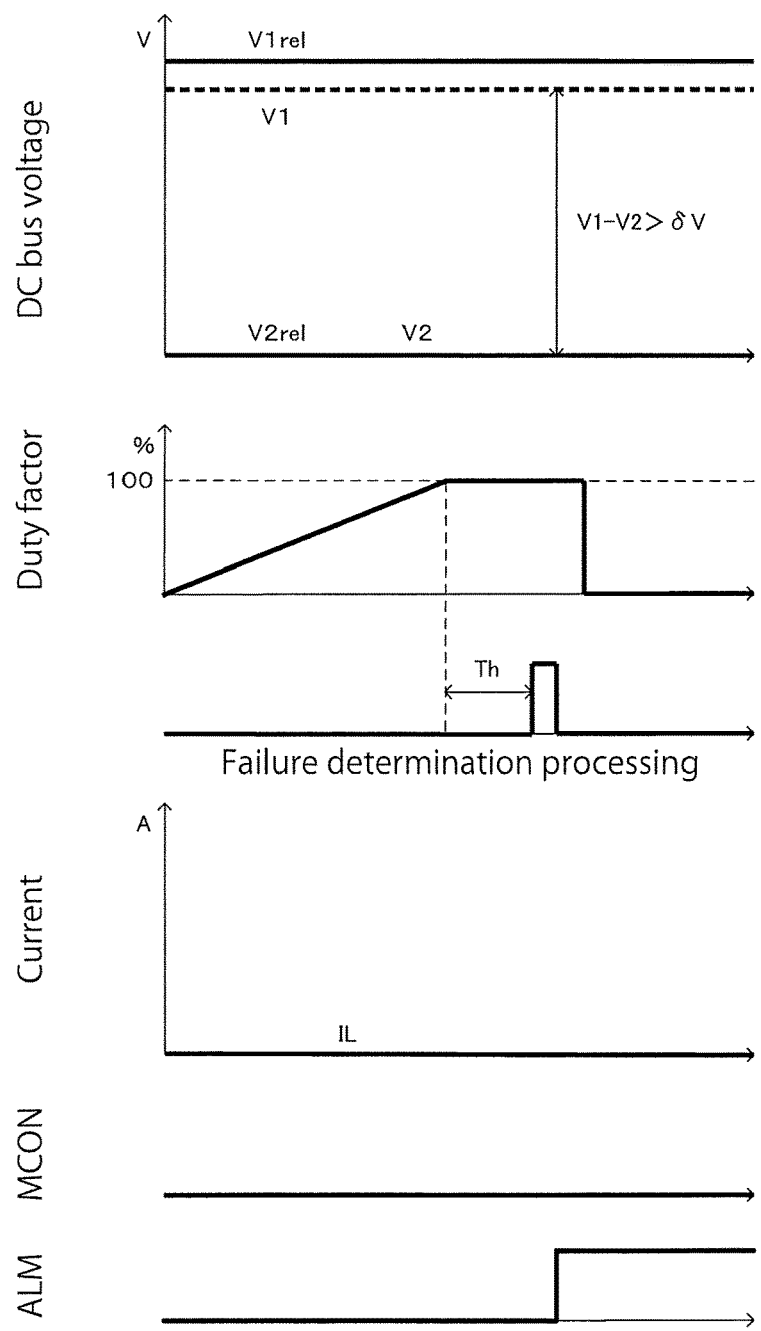
FIG. 4 illustrates how parameters change with time in a charging operation in the embodiment where there is a failure in the DC-to-DC converter.

In this embodiment, in view of the above-described considerations on the basic charging operation, the controller 6 detects the input-side voltage detection value V1 and the output-side voltage detection value V2 when the duty factor is 100% and when the reactor-current detection value IL is approximately zero. When there is no failure in the DC-to-DC converter 5 at a duty factor of 100%, the voltage detection values V1 and V2 are approximately the same. When there is a failure such as wiring disconnection and short-circuiting in the DC-to-DC converter 5, the charging voltage for the smoothing capacitor 7 is insufficient even at a duty factor of 100%, as illustrated in FIG. 4, which is to be compared with FIG. 2. In this situation, it is highly possible that the detection value difference between the input-side voltage detection value VI and the output-side voltage detection value V2 (V1−V2) is large.

In view of this finding, a tolerance, δV, is set at a sufficiently large value in advance, and when the detection value difference (V1−V2) is larger than the tolerance δV, the controller 6 determines that there is a failure in the DC-to-DC converter 5. This enables the controller 6 to use the presence or absence of a failure as a basis for determining whether to directly connect the input-side DC buses 12 to the output-side DC buses 13. As a result, the rush current IMC is prevented from flowing into the smoothing capacitor 7. When the controller 6 has determined that there is a failure because the condition "V1−V2>δV" illustrated in FIG. 4 is met, the controller 6 ON-outputs the emergency signal ALM while keeping the contactor control signal MCON in OFF state. Further, for safety reasons, the controller 6 reduces the duty factor of the DC-to-DC converter 5 to 0% to ensure that the electrical connection between the input-side DC buses 12 and the output-side DC buses 13 is broken. The failure determination processing illustrated in FIG. 4 is to determine whether there is a failure by determining whether the condition "V1−V2<δV" is met. The failure determination processing is performed after the duty factor has reached 100% and when the reactor-current detection value IL is approximately zero. Reference character Th, illustrated in FIG. 4, indicates waiting time and will be described later.

Also in this embodiment, when the controller 6 has determined that there is no failure in the DC-to-DC converter 5 and when the detection value difference between the input-side voltage detection value VI and the output-side voltage detection value V2 (V1−V2) is equivalent to or less than a detection relative error, Verr, which is obtained from the detection error of the input-side voltage detection value V1 and the detection error of the output-side voltage detection value V2, then the controller 6 ON-outputs the contactor control signal MCON to directly connect the input-side DC buses 12 to the output-side DC buses 13.

Figure 5:
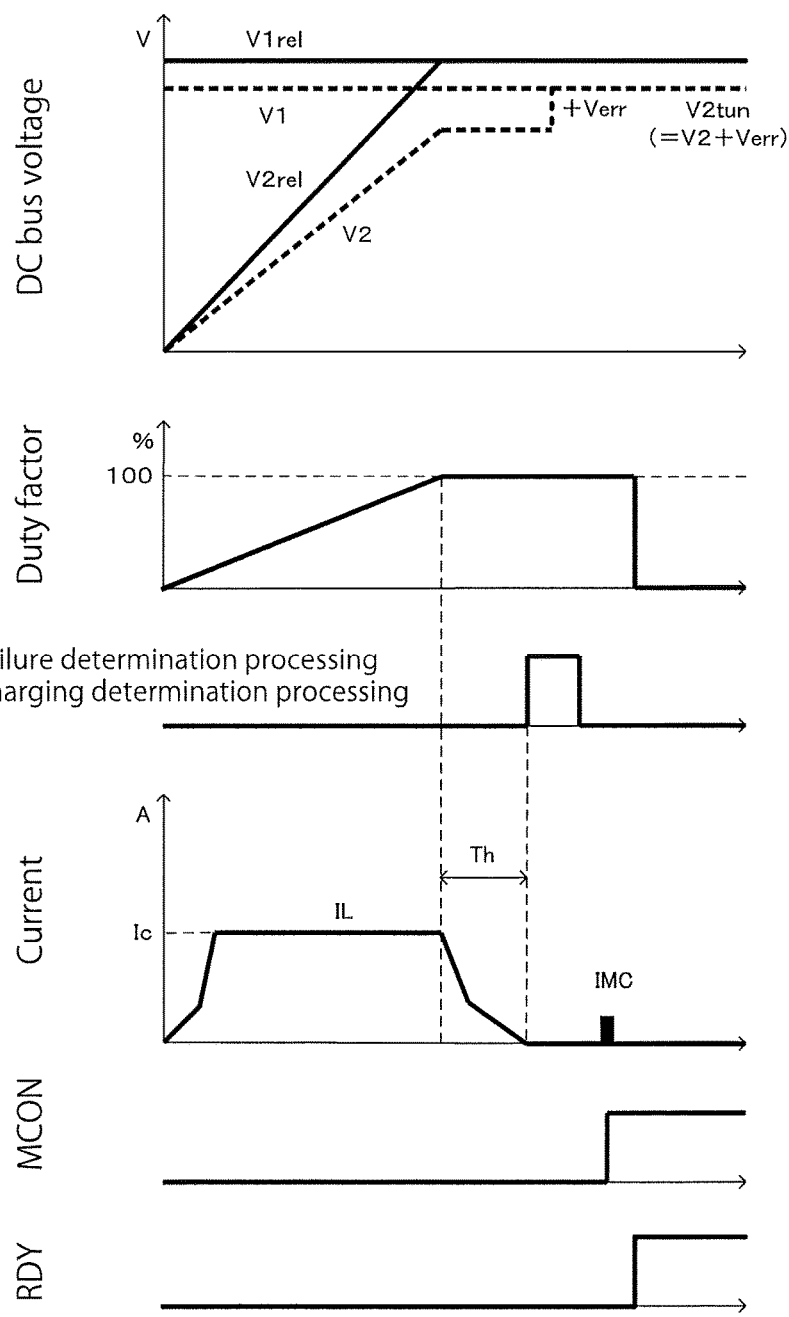
FIG. 5 illustrates how parameters change with time in the charging operation in the embodiment where there is no failure in the DC-to-DC converter.

In the example illustrated in FIG. 5, which is to be compared with FIG. 3, there is no failure in the DC-to-DC converter 5. In this situation, the actual input-side DC bus voltage V1rel and the actual output-side DC bus voltage V2rel coincide when the duty factor reaches 100%. In contrast, the input-side voltage detection value V1 and the output-side voltage detection value V2 do not coincide because of their large detection errors. In this case, a correction voltage detection value V2tun (=V2+Verr) is used, which is obtained by adding the output-side voltage detection value V2 and the detection relative error Verr, which is obtained from the two voltage detection values V1 and V2. When the correction voltage detection value V2tun coincides with the input-side voltage detection value V1 (V1≈V2tun) at approximately the same voltage, the controller 6 determines that the actual input-side DC bus voltage V1rel and the actual output-side DC bus voltage V2rel approximately coincide. The charging determination processing illustrated in FIG. 5 is to determine whether the charging is sufficient by determining whether the condition "V1≈V2tun" is met. The charging determination processing is performed together with the above-described failure determination processing. Reference character Th, illustrated in FIG. 5, indicates waiting time and will be described later.

This configuration enables the controller 6 to confirm that the voltages coincide (that is, confirm that the voltage difference is approximately zero) while eliminating or minimizing the influence of the detection errors inherent in the voltage detectors 31 and 33. After making this confirmation, the controller 6 directly connects the input-side DC buses 12 to the output-side DC buses 13. Specifically, after the controller 6 has directly connected the input-side DC buses 12 to the output-side DC buses 13 by ON-outputting the contactor control signal MCON, the controller 6 ON-outputs the ready signal RDY as well. Further, for safety reasons, the controller 6 reduces the duty factor to 0% to turn off the switching elements $Q_H$ and $Q_L$ so that no current flows through the DC-to-DC converter 5. This configuration eliminates or minimizes the rush current IMC caused by the voltage difference illustrated in FIG. 3, stabilizing the supply of DC power with minimal load on the circuit. Then, after this charging operation is completed, the inverter 8 is operated to supply drive control power to the motor 3.

In this respect, the detection relative error Verr needs to be set from the difference between the input-side voltage detection value V1 and the output-side voltage detection value V2 at a timing when there is a reasonably high possibility that the actual input-side DC bus voltage V1rel and the actual output-side DC bus voltage V2rel coincide. In this embodiment, processing associated with the setting of the detection relative error Verr is referred to as relative error setting processing (see FIG. 6, described later). The relative error setting processing is performed simultaneously with the charging operation or after or before the charging operation. Examples of the timing at which the relative error setting processing is performed include, but are not limited to, when the contactor MC is in connection state with the smoothing capacitor 7 charged to a normal usage level of voltage, and when the duty factor is 100% and the reactor-current detection value IL is approximately zero (these examples are not illustrated in the drawings). Specifically, in the relative error setting processing, the input-side voltage detection value V1 and the output-side voltage detection value V2 are detected, and the detection relative error Verr is set from the difference between the input-side voltage detection value VI and the output-side voltage detection value V2.

In the charging determination processing, the DC buses 12 and 13 are directly connected to each other under the condition that the correction voltage detection value V2tun, which is a tuned value obtained by adding the output-side voltage detection value V2 to the detection relative error Verr, approximately coincides with the input-side voltage detection value V1 (V1≈V2tun=V2+Verr). When, however, the current flowing through the circuit is large enough to make the detection errors inherent in the two voltage detectors 31 and 33 influential, it may not be possible to always secure voltage coincidence. In view of this situation, it is possible to ON-output the contactor control signal MCON under the condition that the difference between the detected two voltage detection values V1 and V2 is equivalent to or less than the detection relative error Verr, which is set in advance (V1−V2≤Verr). In this case, it is possible that a comparatively small amount of rush current IMC flows through the smoothing capacitor 7 due to a slight amount of voltage difference remaining between the DC buses 12 and between the DC buses 13. Still, the rush current IMC is kept least influential.

Control Flow

Figure 6:
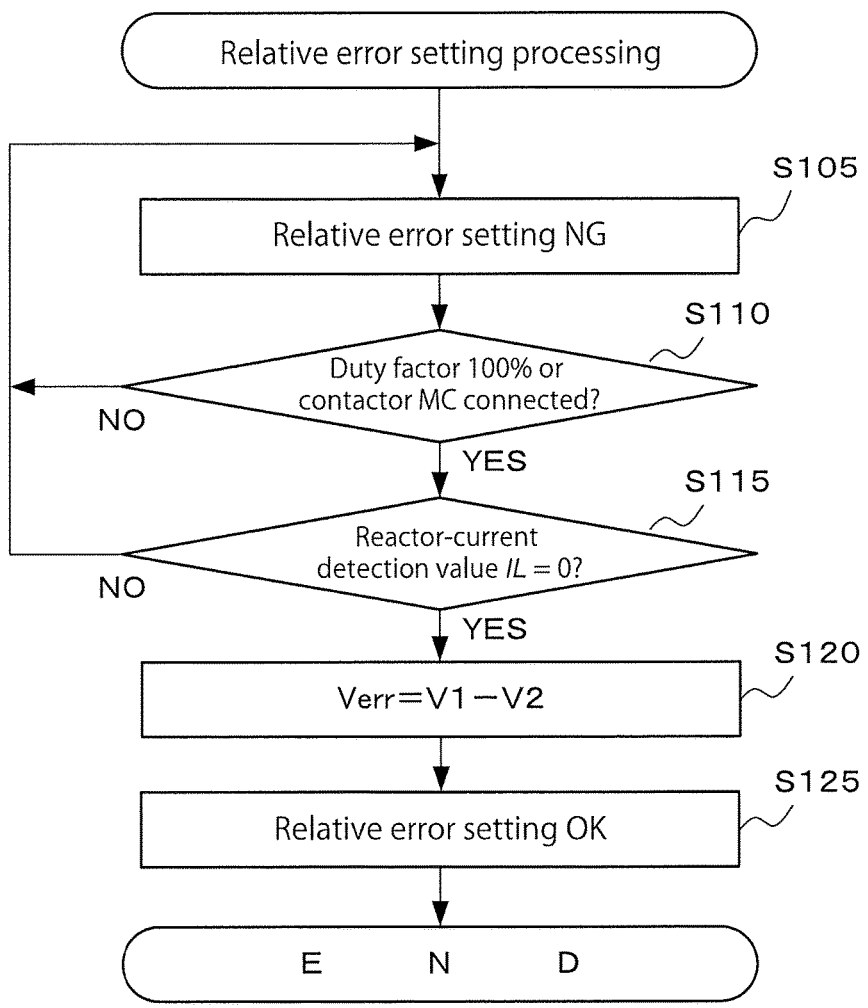
FIG. 6 is a flowchart of a procedure for a control operation performed by CPU of a controller according to the embodiment in performing relative error setting processing.

The above-described functions in the relative error setting processing and the smoothing capacitor charging processing are implemented by the CPU 901 of the controller 6 (see FIG. 9, described later). By referring to FIGS. 6 and 7, procedures for the control performed by the CPU 901 in the relative error setting processing and the smoothing capacitor charging processing will be described. FIG. 6 is a flowchart of a procedure for the relative error setting processing. The relative error setting processing starts and proceeds approximately simultaneously with the smoothing capacitor charging processing illustrated in FIG. 7, described later.

First, at step S105, the CPU 901 performs initial setting by recording relative error setting as incomplete (relative error setting NG).

Next, at step S110, the CPU 901 determines whether the duty factor is 100% or the contactor MC is in connection state (that is, the contactor control signal MCON is ON-output). When the duty factor is less than 100% and when the contactor MC is in connection-broken state, the determination made at this step is "NO", and the procedure returns to step S105, where the above-described processing is performed again.

When at step 110 the CPU 901 has determined that the duty factor is 100% or the contactor MC is in connection state, the determination made at this step is "YES", and the procedure proceeds to step S115.

At step S115, the CPU 901 determines whether the reactor-current detection value IL is zero. When the reactor-current detection value IL is other than zero, the determination made at this step is "NO", and the procedure returns to step S105, where the above-described processing is performed again.

When the reactor-current detection value IL is zero, the determination made at this step is "YES", and the procedure proceeds to step S120.

At step S120, the CPU 901 obtains the value difference (V1−V2) between the input-side voltage detection value V1 and the output-side voltage detection value V2 that have been detected so far. Then, the CPU 901 sets this value difference as the detection relative error Verr.

Next, at step S125, the CPU 901 records the relative error setting as successful (relative error setting OK), and ends the procedure.

In this relative error setting processing, a loop of waiting continues from the start of the relative error setting processing until such a condition is met that there is a reasonably high possibility that the actual input-side DC bus voltage V1rel and the actual output-side DC bus voltage V2rel coincide. When this condition is met, the detection relative error Verr is set.

Figure 7:
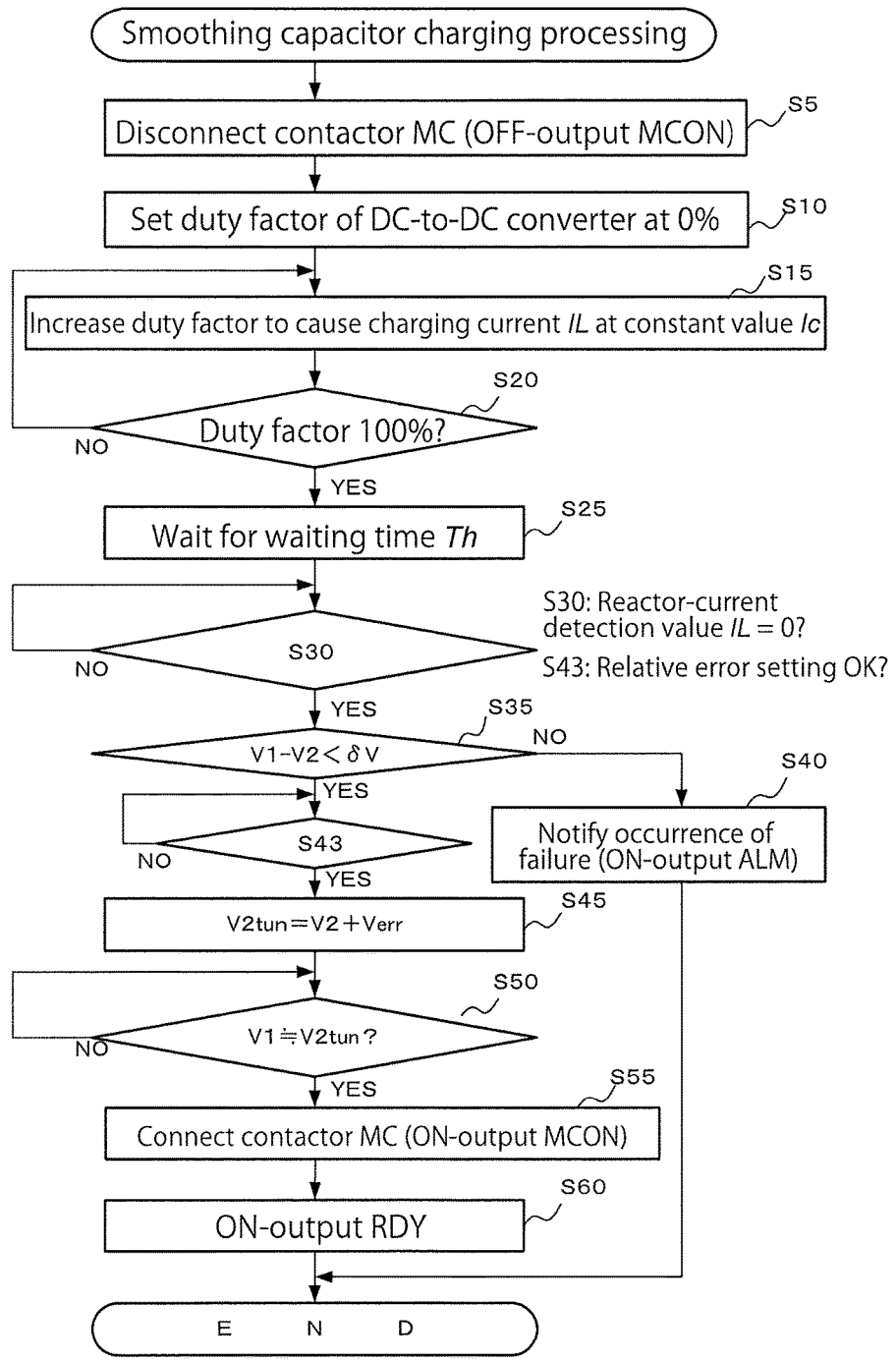
FIG. 7 is a flowchart of a procedure for a control operation performed by the CPU of a controller according to the embodiment in performing smoothing capacitor charging processing.

FIG. 7 is a flowchart of a procedure for the smoothing capacitor charging processing. The smoothing capacitor charging processing starts when the controller 6 starts the charging operation with the motor control system 1 out of operation and the smoothing capacitor 7 completely discharged.

First, at step S5, the CPU 901 OFF-outputs the contactor control signal MCON to bring the contactor MC into connection-broken state, with the DC-to-DC converter 5 connected between the input-side DC buses 12 and the output-side DC buses 13. Also, the CPU 901 resets and OFF-outputs the emergency signal ALM and the ready signal RDY, which is not illustrated in FIG. 7.

Next, at step S10, the CPU 901 resets the duty factor of the DC-to-DC converter 5 to 0%.

Next, at step S15, the CPU 901 refers to the detection value obtained by the reactor current detector 32 and increases the duty factor so that the charging current (reactor-current detection value IL) made to flow to the smoothing capacitor 7 is kept at the constant value Ic.

Next, at step S20, the CPU 901 determines whether the duty factor has reached 100%. When the duty factor is less than 100%, the determination made at this step is "NO", and the procedure returns to step S15, where the above-described processing is performed again.

When the duty factor has reached 100%, the determination made at this step is "YES", and the procedure proceeds to step S25.

At step S25, the CPU 901 waits for the waiting time Th. The waiting time Th is a period of time necessary after the switching of the semiconductor switching elements of the DC-to-DC converter 5 is substantially stopped (complete conduction at 100% duty factor) until the electromagnetic energy accumulated on the reactor 23 is completely released and the reactor-current detection value IL becomes zero (see FIGS. 4 and 5). That is, at the time when step S25 ends, the reactor-current detection value IL is assumed to be approximately zero.

Next, at step S30, the CPU 901 refers to the detection value obtained by the reactor current detector 32 and continues a loop of waiting until the reactor-current detection value IL is completely zero.

Next, at step S35, the CPU 901 determines whether the detection value difference (V1−V2) between the input-side voltage detection value V1 and the output-side voltage detection value V2 that have been detected so far is less than the tolerance δV, which is set in advance. When the detection value difference (V1−V2) is equivalent to or larger than the tolerance δV, the determination made at this step is "NO", and the procedure proceeds to step S40. The processing at step S35 corresponds to the above-described failure determination processing.

At step S40, the CPU 901 ON-outputs the emergency signal ALM to notify an upper-level controller, not illustrated, that a failure has occurred in the DC-to-DC converter 5. Also, the CPU 901 turns off the switching elements $Q_H$ and $Q_L$ to reduce the duty factor of the DC-to-DC converter 5 to 0%, which is not illustrated in FIG. 7. Then, the CPU 901 ends the procedure.

When at step 35 the CPU 901 has determined that the detection value difference (V1−V2) is less than the tolerance δV, the determination made at this step is "YES", and the procedure proceeds to step S43.

At step S43, the CPU 901 continues a loop of waiting until the relative error setting processing is successful (relative error setting OK). As described above, the relative error setting processing illustrated in FIG. 6 and the smoothing capacitor charging processing illustrated in FIG. 7 are performed simultaneously with each other. Hence, when the setting of the detection relative error Verr is completed (when the relative error setting is determined as OK), the procedure exits this loop of waiting and proceeds to step S45. When the setting of the detection relative error Verr has already been completed (the relative error setting has already been determined as OK) before step S43, the procedure skips step S43 and proceeds to step S45.

At step S45, the CPU 901 adds the detection relative error Verr, which is already set in the preceding relative error setting processing, to the output-side voltage detection value V2 so as to tune the correction voltage detection value V2tun.

Next, at step S50, the CPU 901 continues a loop of waiting until the input-side voltage detection value V1 approximately coincides with the correction voltage detection value V2tun tuned at step S45. The processing at step S43 through step S50 corresponds to the above-described charging determination processing.

Next, at step S55, the CPU 901 ON-outputs the contactor control signal MCON to bring the contactor MC into connection state, thereby directly connecting the input-side DC buses 12 to the output-side DC buses 13.

Next, at step S60, the CPU 901 ON-outputs the ready signal RDY to notify the inverter 8 of permission to operate. At the same time, for safety reasons, the CPU 901 reduces the duty factor of the DC-to-DC converter 5 to 0%, which is not illustrated in the drawings. Then, the CPU 901 ends the procedure.

The processing at step S20 is a non-limiting example of the recitation "determining whether the duty factor is 100 percent" in the appended claims; the processing at step S30 is a non-limiting example of the recitation "determining whether a reactor-current detection value of the reactor current flowing through the reactor is approximately zero" in the appended claims; and the processing at step S35 is a non-limiting example of the recitation "determining, based on an input-side detection value of the input-side DC bus voltage and an output-side detection value of the output-side DC bus voltage, whether the failure has occurred in the motor control system" in the appended claims.

Advantageous Effects of The Embodiment

As has been described hereinbefore, the motor control system 1 according to this embodiment includes the controller 6. When the duty factor is 100% and when the reactor-current detection value IL is approximately zero, the controller 6 determines whether there is a failure in the motor control system 1 based on the input-side voltage detection value V1 and the output-side voltage detection value V2. This configuration enables the controller 6 use the presence or absence of a failure as a basis for determining whether to directly connect the input-side DC buses 12 to the output-side DC buses 13. This configuration, in turn, prevents a rush current (which is excessive in amount) from flowing into the smoothing capacitor 7. As a result, the power conversion circuit improves in robustness.

Also in this embodiment, the controller 6 determines that there is a failure in the motor control system 1 when the detection value difference between the input-side voltage detection value V1 and the output-side voltage detection value V2 (V1−V2) is larger than the predetermined tolerance δV. This configuration enables the controller 6 to use the voltage difference between the two voltage detection values V1 and V2 as a basis for determining whether there is a failure in the motor control system 1, thereby reliably preventing a rush current (which is excessive in amount) from flowing into the smoothing capacitor 7.

Also in this embodiment, the controller 6 directly connects the input-side DC buses 12 to the output-side DC buses 13 when the controller 6 has determined that there is no failure in the motor control system 1 and when the detection value difference between the input-side voltage detection value V1 and the output-side voltage detection value V2 (V1−V2) is equivalent to or less than the detection relative error Verr obtained from the detection errors of the two voltage detection values V1 and V2. This configuration enables the controller 6 to confirm that the voltages coincide (that is, confirm that the voltage difference is approximately zero) while eliminating or minimizing the influence of the detection errors inherent in the voltage detectors 31 and 33. After making this confirmation, the controller 6 directly connects the input-side DC buses 12 to the output-side DC buses 13. This configuration, in turn, eliminates or minimizes the rush current caused by the above-described voltage difference, stabilizing the supply of DC power with minimal load on the circuit.

Also in this embodiment, when the actual input-side DC bus voltage V1rel and the actual output-side DC bus voltage V2rel are assumed to approximately coincide, the controller 6 sets the difference between the input-side voltage detection value V1 and the output-side voltage detection value V2 (V1−V2 at the time of the relative error setting processing) as the detection relative error Verr. This configuration enables the controller 6 to set a detection relative error Verr that is more appropriate and more highly accurate at a timing when there is a reasonably high possibility that the actual input-side DC bus voltage V1rel and the actual output-side DC bus voltage V2rel coincide.

The setting of the detection relative error Verr (the relative error setting processing illustrated in FIG. 6) may not necessarily be performed simultaneously with the smoothing capacitor charging processing but may be performed at any other timing when there is a reasonably high possibility that the actual input-side DC bus voltage V1rel and the actual output-side DC bus voltage V2rel coincide. For example, the detection relative error Verr may be set with the contactor MC in connection state after completion of a successful charging operation under normal driving. It is noted that the detection errors of the voltage detection values V1 and V2 depend on the voltage detection values V1 and V2, as illustrated in FIGS. 3 and 5. In view of this, a possible embodiment is to set the detection relative error Verr when the actual input-side DC bus voltage V1rel and the actual output-side DC bus voltage V2rel coincide at a target voltage. Once the setting of the detection relative error Verr is completed, it is possible to repeatedly use the same detection relative error Verr, without repeating the relative error setting processing.

Also in this embodiment, the DC-to-DC converter 5 is a chopper circuit that serves as a step-down converter in which at least the semiconductor switching elements 21 and the reactor 23 are disposed. This configuration implements constant current control that includes increasing with time the duty factor, and this constant current control ensures a smoother, more rapid charging operation of the smoothing capacitor 7.

Modifications

Modifications will be described below.

Figure 8:
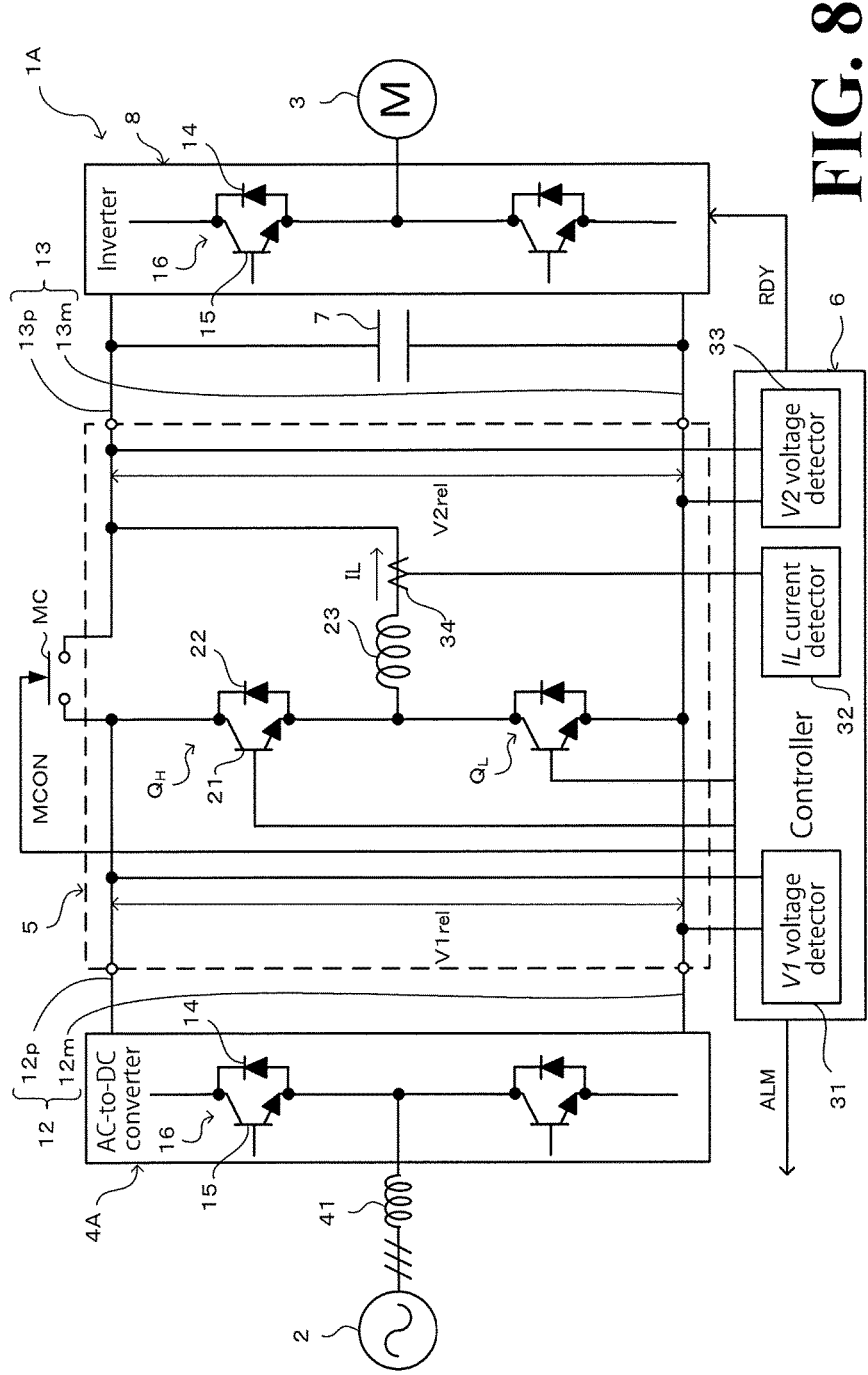
FIG. 8 is a schematic illustrating an exemplary circuit configuration and an exemplary system configuration of a motor control system according to a modification.

FIG. 8 is a schematic illustrating an exemplary circuit configuration and an exemplary system configuration of a motor control system 1A. The motor control system 1A includes an AC-to-DC converter 4A. The AC-to-DC converter 4A has a regeneration function. Referring to FIG. 8, the AC-to-DC converter 4A (regenerator) includes switching circuits 16. Each switching circuit 16 includes a flywheel diode 14 and a bridge-connected semiconductor switching element 15. The flywheel diode 14 is connected in parallel to the semiconductor switching element 15. The motor control system 1A is otherwise similar to the motor control system 1 according to the above-described embodiment and will not be elaborated further here.

Each semiconductor switching element 15 of the AC-to-DC converter 4A is switched by PWM control that is performed by a drive controller, not illustrated, and that is adaptable to the phase of the external AC power source 2. By differentiating the way the PWM control is adapted to the phase of the external AC power source 2, the AC-to-DC converter 4A is capable of switching between the function to convert AC power from the AC power source 2 into DC power and supply the DC power to the input-side DC buses 12 and the regeneration function to convert the DC power through the input-side DC buses 12 into AC power and send the AC power to the AC power source 2. The former function is also implemented by the diode bridge of the flywheel diode 14.

In order to completely stop the motor control system 1A while the motor control system 1A is in conduction state, the controller 6 causes the DC-to-DC converter 5 to serve as what is called a boost converter with the AC-to-DC converter 4A performing the regeneration operation. Specifically, with the contactor MC in connection-broken state, the controller 6 keeps the upper arm switching element $Q_H$ in connection-broken state and switches the lower arm switching element $Q_L$ alone. More specifically, the controller 6 increases with time the duty factor from 0% in the PWM control in the switching of the lower arm switching element $Q_L$, and performs constant current discharging control that includes reducing with time the charging power (charging voltage) while keeping the discharge current from the smoothing capacitor 7 constant.

Thus, the motor control system 1A according to this modification includes the AC-to-DC converter 4A and the DC-to-DC converter 5. The AC-to-DC converter 4A converts DC power through the input-side DC buses 12 into AC power and sends the AC power to the AC power source 2. The DC-to-DC converter 5 is a chopper circuit that serves as a boost converter in which at least the semiconductor switching elements 21 and the reactor 23 are disposed. Thus, with the constant current control that includes increasing with time the duty factor, a smoother, more rapid discharging operation of the smoothing capacitor 7 is ensured, and the motor control system 1A is shutdown in a safer manner.

Exemplary Hardware Configuration of the Controller

By referring to FIG. 9, description will be made with regard to an exemplary hardware configuration of the controller 6 that realizes the processings performed by the input-side DC bus voltage detector 31, the reactor current detector 32, the output-side DC bus voltage detector 33, and other elements implemented by the program executed by the CPU 901.

Figure 9:
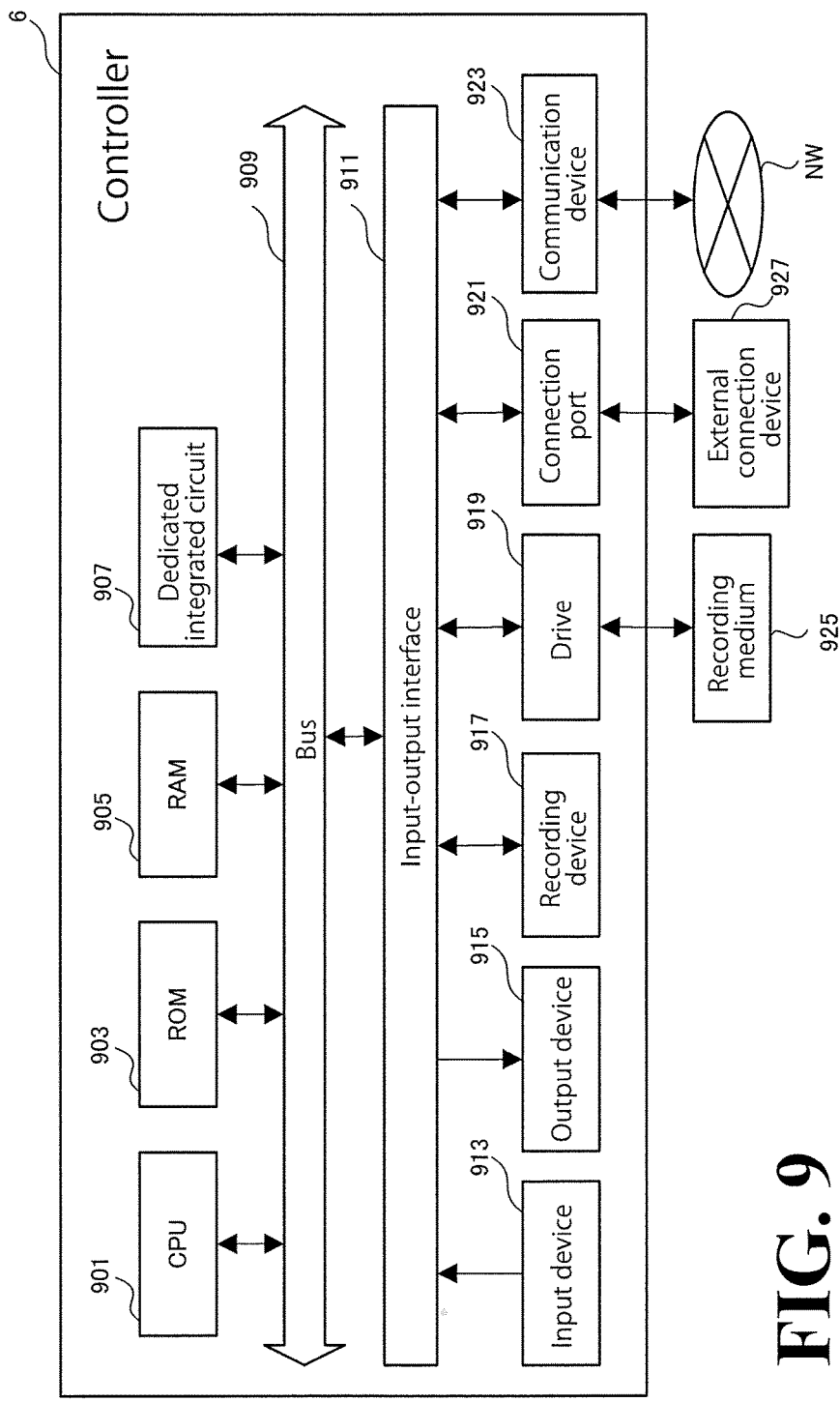
FIG. 9 is a block diagram of an exemplary hardware configuration of the controller.

As illustrated in FIG. 9, the controller 6 includes the CPU 901, a ROM 903, a RAM 905, a dedicated integrated circuit 907, an input device 913, an output device 915, a recording device 917, a drive 919, a connection port 921, and a communication device 923. The dedicated integrated circuit 907 is dedicated to a particular application, examples including, but not limited to, an application specific integrated circuit (ASIC) and a field-programmable gate array (FPGA). These configurations are connected to each other through a bus 909 and an input-output interface 911 so that signals are transmittable to and from the configurations.

The program may be stored in, for example, the ROM 903, the RAM 905, or the recording device 917.

The program may also be temporarily or permanently stored in a removable recording medium 925. Examples of the recording medium 925 include, but are not limited to, a magnetic disc such as a flexible disc; an optical disc such as a compact disc (CD), a magneto-optical (MO) disc, and a digital videodisc (DVD); and a semiconductor memory. The recording medium 925 may also be in the form of what is called packaged software. In this case, the programs stored in the recording medium 925 may be read by the drive 919, transmitted to the recording device 917 through elements such as the input-output interface 911 and the bus 909, and stored in the recording device 917.

The program may also be stored in, for example, a download site, another computer, or another recording device (not illustrated). In this case, the program is transmitted to the communication device 923 through a network NW, such as a local area network (LAN) and the Internet. Then, the program received by the communication device 923 is transmitted to the recording device 917 through elements such as the input-output interface 911 and the bus 909 and stored in the recording device 917.

The program may also be stored in an external connection device 927. In this case, the program is transmitted to the recording device 917 through elements such as the connection port 921, the input-output interface 911, and the bus 909, and stored in the recording device 917.

Then, based on the program stored in the recording device 917, the CPU 901 performs the processings implemented by the above-described elements such as the input-side DC bus voltage detector 31, the reactor current detector 32, and the output-side DC bus voltage detector 33. In order to execute the program, the CPU 901 may read the program directly from the recording device 917 or load the program into the RAM 905. In the case where the CPU 901 receives the program through elements such as the communication device 923, the drive 919, and the connection port 921, the CPU 901 may execute the received program without storing the program in the recording device 917.

As necessary, the CPU 901 may perform the various processings based on a signal(s) or information input through the input device 913 (examples including, but not limited to, a mouse, a keyboard, and a microphone, not illustrated).

Then, the CPU 901 may output the results of the processings from the output device 915 (examples including, but not limited to, a display device and a sound output device). As necessary, the CPU 901 may transmit the results of the processings through elements such as the communication device 923 and the connection port 921 or store the results of the processings in the recording device 917 or the recording medium 925.

As used herein, the terms "perpendicular", "parallel", and "plane" may not necessarily mean "perpendicular", "parallel", and "plane", respectively, in a strict sense. Specifically, the terms "perpendicular", "parallel", and "plane" mean "approximately perpendicular", "approximately parallel", and "approximately plane", respectively, with design-related and production-related tolerance and error taken into consideration.

Also, when the terms "identical", "same", "equivalent", and "different" are used in the context of dimensions, magnitudes, sizes, or positions, these terms may not necessarily mean "identical", "same", "equivalent", and "different", respectively, in a strict sense. Specifically, the terms "identical", "same", "equivalent", and "different" mean "approximately identical", "approximately same", "approximately equivalent", and "approximately different", respectively, with design-related and production-related tolerance and error taken into consideration.

Otherwise, the above-described embodiments and modifications may be combined in any manner deemed suitable.

Obviously, numerous modifications and error of the present disclosure are possible in light of the above teachings. It is therefore to be understood that within the scope of the appended claims, the present disclosure may be practiced otherwise than as specifically described herein.

What is claimed is:

1. A motor control system, comprising:
   a DC-to-DC converter comprising a semiconductor switch and a reactor configured to cooperate with the semiconductor switch to convert an input-side DC bus voltage across first and second input-side DC buses into a predetermined output-side DC bus voltage across first and second output-side DC buses and to output the output-side DC bus voltage;
   control circuitry configured to control a duty factor of the semiconductor switch and determine, based on an input-side detection value of the input-side DC bus voltage and an output-side detection value of the output-side DC bus voltage, whether there is a failure in the motor control system when the duty factor is 100 percent and a reactor-current detection value of a reactor current flowing through the reactor is approximately zero;
   a smoothing capacitor connected to the first and second output-side DC buses and disposed between the first and second output-side DC buses; and
   an inverter connected to the smoothing capacitor through the first and second output-side DC buses and configured to convert DC power from the first and second output-side DC buses into AC power and supply the AC power to a motor.

2. The motor control system according to claim 1, wherein when a detection value difference between the input-side detection value of the input-side DC bus voltage and the output-side detection value of the output-side DC bus voltage is larger than a predetermined tolerance, the control circuitry is configured to determine that the failure has occurred in the motor control system.

3. The motor control system according to claim 2, wherein the control circuitry is configured to respectively directly connect the first and second input-side DC buses to the first and second output-side DC buses when the control circuitry has determined that there is no failure in the motor control system and when the detection value difference between the input-side detection value of the input-side DC bus voltage and the output-side detection value of the output-side DC bus voltage is equivalent to or less than a detection relative error obtained from an input-side detection error of the input-side detection value and an output-side detection error of the output-side detection value.

4. The motor control system according to claim 3, wherein when the input-side DC bus voltage and the output-side DC bus voltage are estimated to be approximately identical to each other, the control circuitry is configured to set the detection value difference between the input-side detection value of the input-side DC bus voltage and the output-side detection value of the output-side DC bus voltage as the detection relative error.

5. The motor control system according to claim 4, wherein the DC-to-DC converter further comprises a chopper circuit being a step-down converter including the semiconductor switch and the reactor.

6. The motor control system according to claim 5, further comprising:
   a regenerator configured to convert DC power from the first and second input-side DC buses into AC power,
   wherein the chopper circuit of the DC-to-DC converter is configured to be a boost converter including the semiconductor switch and the reactor.

7. The motor control system according to claim 4, further comprising:
   a regenerator configured to convert DC power from the first and second input-side DC buses into AC power,
   wherein the DC-to-DC converter further comprises a chopper circuit being a boost converter including the semiconductor switch and the reactor.

8. The motor control system according to claim 3, wherein the DC-to-DC converter further comprises a chopper circuit being a step-down converter including the semiconductor switch and the reactor.

9. The motor control system according to claim 2, wherein the DC-to-DC converter further comprises a chopper circuit being a step-down converter including the semiconductor switch and the reactor.

10. The motor control system according to claim 3, further comprising:
    a regenerator configured to convert DC power from the first and second input-side DC buses into AC power,
    wherein the DC-to-DC converter further comprises a chopper circuit being a boost converter including the semiconductor switch and the reactor.

11. The motor control system according to claim 8, further comprising:
    a regenerator configured to convert DC power from the first and second input-side DC buses into AC power,
    wherein the chopper circuit of the DC-to-DC converter is configured to be a boost converter including the semiconductor switch and the reactor.

12. The motor control system according to claim 2, further comprising:
    a regenerator configured to convert DC power from the first and second input-side DC buses into AC power,
    wherein the DC-to-DC converter further comprises a chopper circuit being a boost converter including the semiconductor switch and the reactor.

13. The motor control system according to claim 9, further comprising:
    a regenerator configured to convert DC power from the first and second input-side DC buses into AC power,
    wherein the chopper circuit of the DC-to-DC converter is configured to be a boost converter including the semiconductor switch and the reactor.

14. The motor control system according to claim 1, wherein the DC-to-DC converter further comprises a chopper circuit being a step-down converter including the semiconductor switch and the reactor.

15. The motor control system according to claim 14, further comprising:
    a regenerator configured to convert DC power from the first and second input-side DC buses into AC power,
    wherein the chopper circuit of the DC-to-DC converter is configured to be a boost converter including the semiconductor switch and the reactor.

16. The motor control system according to claim 1, further comprising:
    a regenerator configured to convert DC power from the first and second input-side DC buses into AC power,
    wherein the DC-to-DC converter further comprises a chopper circuit being a boost converter including the semiconductor switch and the reactor.

17. An initial charger, comprising:
    a DC-to-DC converter comprising a semiconductor switch and a reactor configured to cooperate with the semiconductor switch to convert an input-side DC bus voltage across first and second input-side DC buses into a predetermined output-side DC bus voltage across first and second output-side DC buses and to output the output-side DC bus voltage;

control circuitry configured to control a duty factor of the semiconductor switch; and a smoothing capacitor connected to the first and second output-side DC buses and disposed between the first and second output-side DC buses, wherein the control circuitry is configured to determine, based on an input-side detection value of the input-side DC bus voltage and an output-side detection value of the output-side DC bus voltage, whether initial charging of the smoothing capacitor is completed when the duty factor is 100 percent and when a reactor-current detection value of a reactor current flowing through the reactor, is approximately zero.

18. A method for detecting a failure in a motor control system, comprising:

determining whether a duty factor of a semiconductor switch in a DC-to-DC converter is 100 percent;

determining whether a reactor-current detection value of a reactor current flowing through a reactor in the DC-to-DC converter is approximately zero; and determining, based on an input-side detection value of an input-side DC bus voltage and an output-side detection value of an output-side DC bus voltage, whether a failure has occurred in a motor control system when the duty factor has been determined to be 100 percent and the reactor-current detection value of the reactor current flowing through the reactor has been determined to be approximately zero, wherein the motor control system comprises the DC-to-DC converter comprising the semiconductor switch and the reactor configured to cooperate with the semiconductor switch to convert the input-side DC bus voltage across first and second input-side DC buses into a predetermined output-side DC bus voltage across first and second output-side DC buses and to output the output-side DC bus voltage, control circuitry configured to control the duty factor of the semiconductor switch, a smoothing capacitor connected to the first and second output-side DC buses and disposed between the first and second output-side DC buses, and an inverter connected to the smoothing capacitor through the first and second output-side DC buses and configured to convert DC power from the first and second output-side DC buses into AC power and supply the AC power to a motor.

19. The method of claim 18, wherein when a detection value difference between the input-side detection value of the input-side DC bus voltage and the output-side detection value of the output-side DC bus voltage is larger than a predetermined tolerance, the control circuitry determines that the failure has occurred in the motor control system.

20. The method of claim 19, wherein the control circuitry respectively directly connects the first and second input-side DC buses to the first and second output-side DC buses when the control circuitry has determined that there is no failure in the motor control system and when the detection value difference between the input-side detection value of the input-side DC bus voltage and the output-side detection value of the output-side DC bus voltage is equivalent to or less than a detection relative error obtained from an input-side detection error of the input-side detection value and an output-side detection error of the output-side detection value.

* * * * *